US010663068B2

(12) United States Patent
Puranik et al.

(10) Patent No.: US 10,663,068 B2
(45) Date of Patent: May 26, 2020

(54) WEDGE GUIDE (71) Applicant: Worldwide Oilfield Machine, Inc., Houston, TX (US)

(72) Inventors: Sudhir Shrivallabh Puranik, Houston, TX (US); Anand Kalimuthu, Houston, TX (US); William Thomas Burbank, Jr., Houston, TX (US); Mansing Mohan Phase, Houston, TX (US); Kauntey Suresh Angal, Houston, TX (US)

( * ) Notice: Subject to any disclaimer, the term of this patent is extended or adjusted under 35 U.S.C. 154(b) by 0 days.

(21) Appl. No.: 15/902,306

(22) Filed: Feb. 22, 2018

(65) Prior Publication Data

US 2019/0277409 A1 Sep. 12, 2019

Related U.S. Application Data (60) Provisional application No. 62/537,639, filed on Jul. 27, 2017.

(51) Int. Cl.
*F16K 3/20* (2006.01)
*F16K 3/18* (2006.01)

(52) U.S. Cl.
CPC ............. *F16K 3/186* (2013.01); *F16K 3/205* (2013.01)

(58) Field of Classification Search
USPC ................................................. 251/326–329
See application file for complete search history.

(56) References Cited

U.S. PATENT DOCUMENTS

| | | | | | |
|---|---|---|---|---|---|
| 769,831 | A | * | 9/1904 | Ogden | F16K 3/0227 251/328 |
| 3,823,911 | A | * | 7/1974 | Natho | F16K 3/186 251/167 |
| 4,179,098 | A | * | 12/1979 | Laitkep | F16K 3/186 251/167 |
| 4,193,581 | A | * | 3/1980 | Eilers | F16K 3/186 251/167 |
| 4,377,273 | A | * | 3/1983 | Beson | F16K 3/202 251/210 |
| 4,629,161 | A | * | 12/1986 | Jones | F16K 3/186 251/327 |
| 5,445,359 | A | * | 8/1995 | Beson | F16K 3/205 251/159 |
| 8,973,897 | B2 | * | 3/2015 | Cordova | F16K 3/02 251/327 |

* cited by examiner

*Primary Examiner* — John Fox
(74) *Attorney, Agent, or Firm* — Kenneth L. Nash; Thomas D. Nash (57) ABSTRACT A wedge guide has two wedge surfaces. The first angled surface engages a first seat retainer positioned on one side of a gate to lock the first seat retainer in a first pocket. The wedge guide has a second angled surface that engages a second seat retainer on the other side of the gate that locks the second seat retainer in a second pocket. The wedge guide does not affect the movement of the seats that move axially between the gate and the respective seat retainers. Two wedge guides are preferably utilized on opposite non-sealing sides of the gate so that the gate slides between them.

20 Claims, 8 Drawing Sheets

WEDGE GUIDE

This application claims benefit of U.S. provisional application 62/537,639 filed Jul. 27, 2017, which is incorporated herein in its entirety.

BACKGROUND OF THE INVENTION

Field of the Invention

The present invention relates generally to seat elements in gate valves and more specifically to securing two seat retainers on either side of the gate within corresponding pockets of the gate valve body utilizing a wedge guide or typically two wedge guides for each gate valve.

Background of the Invention

Gate valves are used in a variety of industries to control the flow of fluids. In particular, gate valves are used extensively in the oil & gas industries to control the flow of produced fluids of various stages of production. Most gate valves used in industry comprise a valve body having a longitudinal flow bore and a transverse gate cavity that intersects the flow bore. A gate having a gate opening extending transversely therethrough is disposed in the gate cavity. A stem is provided for moving the gate between the open position, in which the gate opening is aligned with the flow bore, and a closed position wherein a blank surface of the gate prevents flow through the flow bore.

The gate valve used herein may comprise a two component seat assembly on each side of the gate. Each seat assembly then comprises a seat retainer and a seat that are telescopingly interconnected for sliding relative movement. By telescoping it is meant that the seat retainer and seat comprise concentric tubular parts that slide with respect to each other in a manner like the concentric tubular components of a collapsible telescope. Although in this case, the relative sliding movement seat is only for a very short distance with respect to the gate. The seat is axially moveable along an axis of the flow bore on either side of the gate to provide advantageous upstream and downstream seals.

Exemplary examples of the seat assemblies of the present invention are shown in U.S. Pat. No. 6,955,537 for Valve with Seat Assembly, U.S. Pat. No. 6,279,875 for Gate Valve with Improved Seat Assembly, U.S. Pat. No. 6,260,822 for Seat Assembly for a Gate Valve, U.S. Pat. No. 5,201,872 for Gate Valve Improvement, and U.S. Pat. No. 4,878,651 for Valve Seat Assembly, all of which are hereby incorporated herein by reference in their entirety.

In these designs, which may be referred to as the patented Magnum™ design, in certain service conditions like subsea and subzero temperatures as low as −50 degree Fahrenheit, as well as high temperatures up to 450 degree Fahrenheit, extrusion of the face seal off the seat retainers and leakage path between the seat retainer face and seat pocket face may occur and cause downtime. Many options were attempted to get over this issue but did not get consistent results.

Accordingly, those of skill in the art will appreciate the present invention which overcomes the problems of the prior art designs to provide a positive lock for the seat retainer and pocket under all operating temperature conditions and very high pressure. The present invention still allows easy removal of the seat retainers from the pockets for maintenance purposes.

SUMMARY OF THE INVENTION

One object of the present invention is to provide an improved gate valve that creates a bubble tight seal even under working pressures up to 20,000 PSI and temperatures as low as −50 F.

Another object of the present invention is to mount wedge guides within the valve so that the seat retainers are pushed back to the seat pocket creating a positive lock under all operating temperature conditions thus leaving no gap between the seat pocket face and the seat retainer face.

Another object of the present invention is to provide wedge guides with a tapered surface that engages a corresponding tapered area on the seat retainer face to create a positive lock.

Another object of the present invention is to provide that as the wedge guide is forced downwardly either by tightening the bonnet or by other means the wedge guide is permanently mounted in place for operation but is easily removable for maintenance.

Another object is to provide a wedge guide that goes between two seat retainers of a seat assembly. The seat assembly also includes a seat that is energized by the bore pressure and moves telescopingly to achieve bore pressure adjusted sealing with the gate. With high pressure, the force of the seat against the gate is higher. With low pressure the force is lower. Bore pressure adjusted sealing reduces wear on the seat and gate. The operation of the seat assembly is further described in the patents incorporated herein by reference.

One general aspect comprises a wedge guide for a gate valve. The gate valve comprises a valve body that defines therein a flow path through the valve body and a gate cavity that intersects the flow path. A gate is disposed in the gate cavity across the flow path and is moveable to open and close the flow path. A valve body defines a first pocket in the valve body on one side of the gate and a second pocket in the valve body on an opposite side of the gate. A first seat assembly surrounds the flow path and is positioned between the first pocket and the gate. The first seat assembly comprises a first seat and a first seat retainer. The first seat is adjacent to the gate and is slidable with respect to the first seat retainer. The first seat is axially movable between the gate and the first seat retainer with respect to an axis through the flow path. The gate valve also comprises a second seat assembly surrounding the flow path positioned between the second pocket and gate. The second seat assembly comprises a second seat and a second seat retainer. The second seat is adjacent to the gate, the second seat is slidable with respect to the second seat retainer. The second seat is axially movable between the gate and the second seat retainer with respect to an axis through the flow path.

A wedge guide comprises a first wedge surface that engages the first seat retainer to urge the first seat retainer into the first pocket to prevent movement of the first seat retainer with respect to the first pocket. The wedge guide comprises a second wedge surface that engages the second seat retainer to urge the second seat retainer into the second pocket to prevent movement of the second seat retainer with respect to the second pocket.

Implementations may include one or more of the following features. The wedge guide further comprises a second wedge guide. The second wedge guide also comprises a first wedge surface that engages the first seat retainer to urge the first seat retainer into the first pocket to prevent movement of the first seat retainer with respect to the first pocket. The second wedge guide also comprises a second wedge surface that engages the second seat retainer to urge the second seat retainer into the second pocket to prevent movement of the second seat retainer with respect to the second pocket. The wedge guide further comprises that the gate is positioned between the wedge guide and the second wedge guide. The gate is slidable with respect to the wedge guide and the second wedge guide. The wedge guide further comprises a rounded surface that engages an interior of the gate cavity. The wedge guide further comprises a flat surface that slidingly engages the gate. The flat surface is positioned on an opposite side of the wedge guide from the rounded surface. The wedge guide further comprises the first wedge surface and the second wedge surface are positioned at a lower end of the wedge guide when the valve body is oriented for operation. The wedge guide further comprises that the first wedge surface and the second wedge surface are angled with respect to an axis through the wedge guide.

The wedge guide comprises an opening that is engageable to remove the wedge guide from the valve body.

The gate valve further comprises angled surfaces on the first seat retainer and the second seat retainer that engage the first wedge surface and the second wedge surface. The gate valve further comprises the wedge guide is rigid so that so that the first wedge surface and the second wedge surface are angled prior to engagement with the first seat retainer and the second seat retainer.

The wedge guide assembly where the first wedge surface on each of the two wedge guides comprises an inclined surface that is angled with respect to an axis through each of the two wedge guides, and where the second wedge surface on each of the two wedge guides comprises an inclined surface that is angled with respect to the axis through each of the two wedge guides.

The wedge guide assembly where the first wedge surface on each of the two wedge guides is angled by less than two degrees with respect to an axis through each of the two wedge guides, and where the second wedge surface on each of the two wedge guides is angled by less than two degrees. The wedge guide assembly where the first seat retainer comprises two inclined surfaces that engage the first wedge surface on each of the two wedge guides and where the second seat retainer comprises two inclined surfaces that engage the second wedge surface on each of the two wedge guides. The wedge guide assembly where each of the two wedge guides are sufficiently rigid in that the two wedge guides do not flex during operation.

The two wedge guides each comprises an opening that is engageable with a tool or the like to remove the two wedge guides from the valve body. The gate valve further comprises a bonnet that attaches to the valve body, a surface on each of the two wedge guides that engages the bonnet so that as the bonnet is tightened to the valve body then each wedge guide locks the seat retainer of each of the two seat assemblies into one of the two pockets to prevent further movement of seat retainers with respect to the valve body. The gate valve further comprises a rounded surface for each of the two wedge guides are engaged with a corresponding rounded surface in the valve body.

The wedge guide assembly wherein the two wedge guides each comprises an opening. The opening in each of the two wedge guides is engageable to remove the two wedge guides from the valve body.

One general aspect comprises two wedge guides. The gate valve comprises a first seat assembly is on a first side of the gate. The first seat assembly comprises a first seat adjacent the first side of the gate. A first seat retainer is mounted in the first pocket. The first seat is slidably mounted with the first seat retainer and is axially movable between the gate and the first seat retainer along an axis through the flow path.

The wedge guide assembly also comprises a first wedge surface on each of the two wedge guides that engages the first seat retainer to prevent movement of the first seat retainer in the first pocket with respect to the valve body. The wedge guide assembly also comprises a second wedge surface on each of the two wedge guides that engages the second seat retainer to prevent movement of the second seat retainer in the second pocket with respect to the valve body.

The gate valve also comprises a second seat assembly on a second side of the gate. The second seat assembly comprises a second seat adjacent the second side of the gate. A second seat retainer is mounted in the second pocket. The second seat is slidably mounted with the second seat retainer. The second seat is axially movable between the gate and the second seat retainer with respect to an axis through the flow path.

Implementations may include one or more of the following features. The wedge guide assembly where the first wedge surface on each of the two wedge guides comprises an inclined surface that is angled with respect to an axis through each of the two wedge guides, and where the second wedge surface on each of the two wedge guides comprises an inclined surface that is angled with respect to the axis through each of the two wedge guides. The wedge guide assembly where the first wedge surface on each of the two wedge guides is angled by less than two degrees with respect to an axis through each of the two wedge guides, and where the second wedge surface on each of the two wedge guides is angled by less than two degrees.

The gate valve where the first seat retainer comprises two inclined surfaces that engage the first wedge surface on each of the two wedge guides, and where the second seat retainer comprises two inclined surfaces that engage the second wedge surface on each of the two wedge guides.

The wedge guide assembly where each of the two wedge guides is sufficiently rigid in that the two wedge guides do not flex during operation. The wedge guide assembly the two wedge guides each comprises an opening, the opening in each of the two wedge guides is engageable to remove the two wedge guides from the valve body.

In one embodiment, a bonnet attaches to the valve body and a surface on each of the two wedge guides that engages the bonnet so that as the bonnet is tightened to the valve body then each wedge guide locks the seat retainer of each of the two seat assemblies into one of the two pockets to prevent further movement of seat retainers with respect to the valve body. The wedge guide assembly further comprises a rounded surface for each of the two wedge guides is engaged with a corresponding rounded surface in the valve body. The wedge guide assembly wherein the two wedge guides each comprises an opening that is engageable with a tool to remove the two wedge guides from the valve body.

One general aspect comprises a wedge guide assembly for a gate valve comprising a gate movable to open and close a flow path through a valve body. Two seat assemblies surround the flow path. The gate is mounted between the two seat assemblies. Each of the two seat assemblies comprises a seat retainer and a seat that slidingly move with respect to each other. The seat of each of the two seat assemblies is movable axially between the gate and the seat retainer with respect to an axis of the flow path.

The wedge guide assembly comprises two wedge guides, each wedge guide comprising two wedge surfaces, the two wedge surfaces of each wedge guide engage respective surfaces on the seat retainer of the two seat assemblies to prevent the seat retainer of the two seat assemblies to move with respect to the valve body, the gate being mounted between the two wedge guides.

The gate valve comprises a valve body that defines therein a flow path through the valve body and a gate cavity that intersects the flow path. A gate is disposed in the gate cavity across the flow path. The gate is moveable to open and close the flow path. The valve body defines a first pocket in the valve body on one side of the gate and a second pocket in the valve body on an opposite side of the gate. A first seat element engages the first pocket and a second seat element engages the second pocket.

A wedge guide comprises a first angled surface that engages the first seat element to prevent movement of the first seat element with respect to the first pocket. The wedge guide comprising a second angled surface that engages the second seat element to urge the second seat element into the second pocket to prevent movement of the second seat element with respect to the second pocket.

BRIEF DESCRIPTION OF THE DRAWINGS

The above general description and the following detailed description are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE INVENTION

Detailed descriptions of an embodiment of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
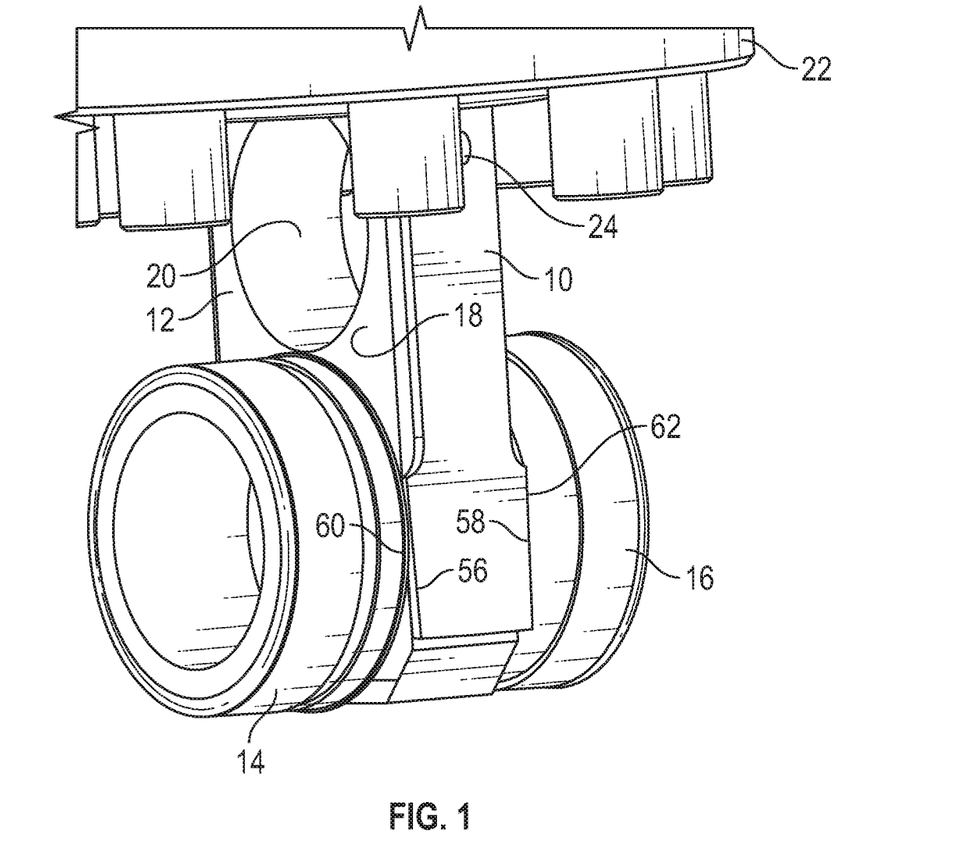
FIG. 1 is a perspective view showing a wedge guide that engages the seat retainer on both sides of the gate in accord with one embodiment of the present invention.

FIG. 1 shows a wedge guide 10 positioned adjacent a side or edge of gate 12. Wedge guide 10 is fixed in position. During operation of the valve, gate 12 slidingly moves up and down with respect to wedge guide 10. First seat retainer 14 is positioned on a first sealing side of the gate. Second seat retainer 16 is on an opposite sealing side of the gate. One side of wedge guide 10 engages first seat retainer 14. The other side of wedge guide 10 engages second seat retainer 16.

In other words, a first tapered surface 56 on the wedge guide engages first tapered surface 60 on first seat retainer 14. Wedge guide second tapered surface 58 engages second tapered surface 62 on second seat retainer 16.

An opening 20 is shown through the gate. During operation, the gate moves up and down to open and close the gate valve. Because in FIG. 1 the gate is closed, first seat retainer 14 is adjacent the blank portion 18 of gate 12.

In this embodiment, the wedge guide 10 is secured in position by the bottom 22 of the bonnet. Once the wedge guide 10 is inserted between the two seat retainers, then the wedge guide is securely fastened.

Accordingly, in another embodiment, it is not necessary for the wedge guide to be secured by the bonnet. The wedge guide could be shorter and is not necessarily required to be held in place by the bonnet.

A wedge guide opening 24 is shown that can be used to pull the wedge guide 10 out of the valve body after the bonnet is removed if it is desired to perform maintenance of the gate valve such as with a hook or other tool (not shown). Accordingly, the wedge guide can be readily removed when maintenance is required.

The taper or angle utilized on the wedge guide and seat retainer to compress the seat retainers within the pockets is chosen to encompass tolerances of several components including the first and second pockets 40, 42 (see FIG. 13), first and second seat retainers 14, 16, and the wedge guide which is shown in FIG. 1. The wedge guide pushes the seat retainers 14, 16 to the back of the pocket 40, 42 creating a positive lock of the seat retainers 14, 16 in the pockets 40, 42 under all operating temperature conditions thus leaving no gap between the pocket face (the side of the pocket facing the seat retainer) and the seat retainer face (the side of the seat retainer facing the pocket).

Figure 12:
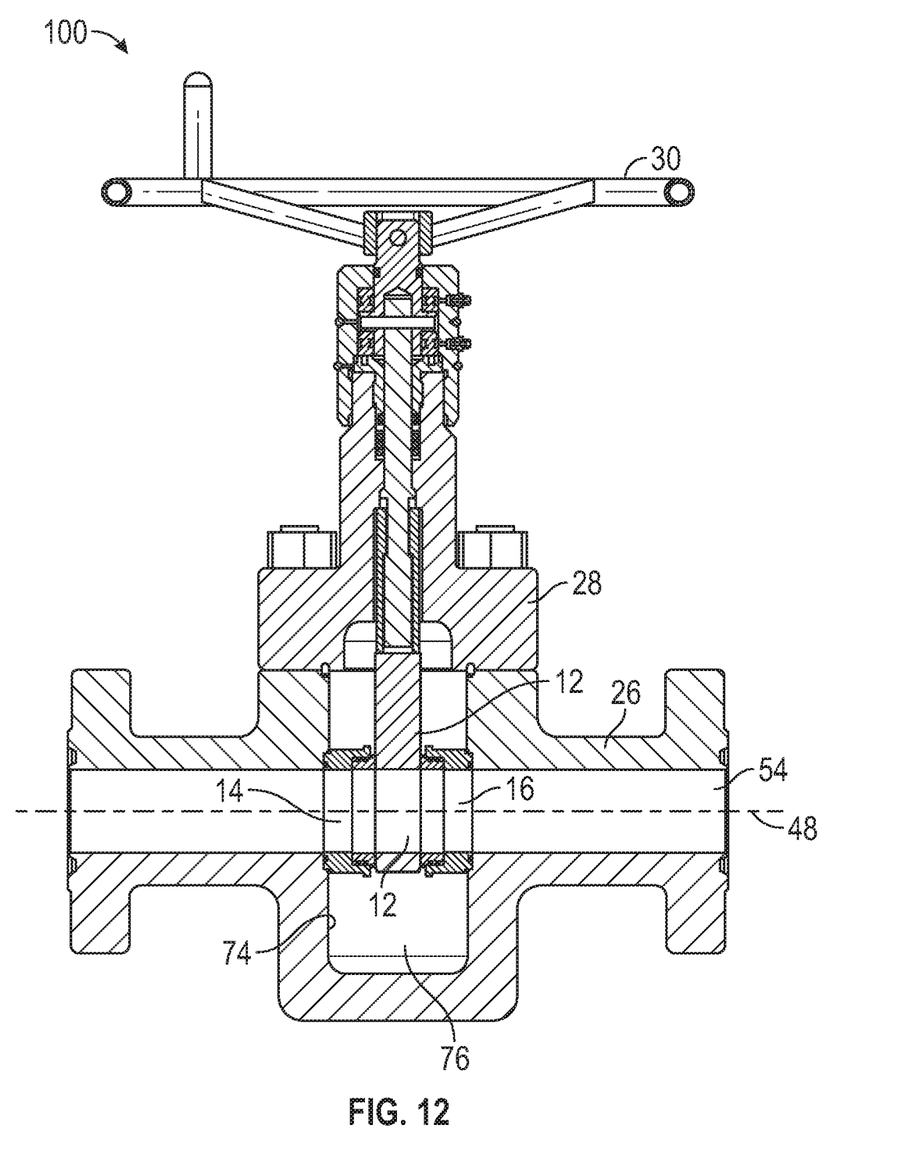
FIG. 12 is a sectional view of a valve body showing a seat retainer and seat assembly on both opening/closure sides of the gate with the seat retainer of each seat retainer in respective pockets on both sides of the gate in accord with one embodiment of the present invention.

Turning briefly to FIG. 12, there is shown an exemplary gate valve 100 in cross-section. Valve body 26 is shown with bonnet 28 mounted to the top of valve body 26. The valve operator is a manual operator wheel 30 that is used to open and close the gate 12. A motorized operator could also be used to open and close the gate. In FIG. 12, the gate valve 100 is in an open position so that fluid flows though the seat assemblies including seat retainers 14, 16. FIG. 12 also discloses in cross-section the interior surface 74 of the transverse gate cavity 76 that intersects flow bore 54 and flow bore axis 48. The flow bore may be referred to as a flow path or the like.

Figure 13:
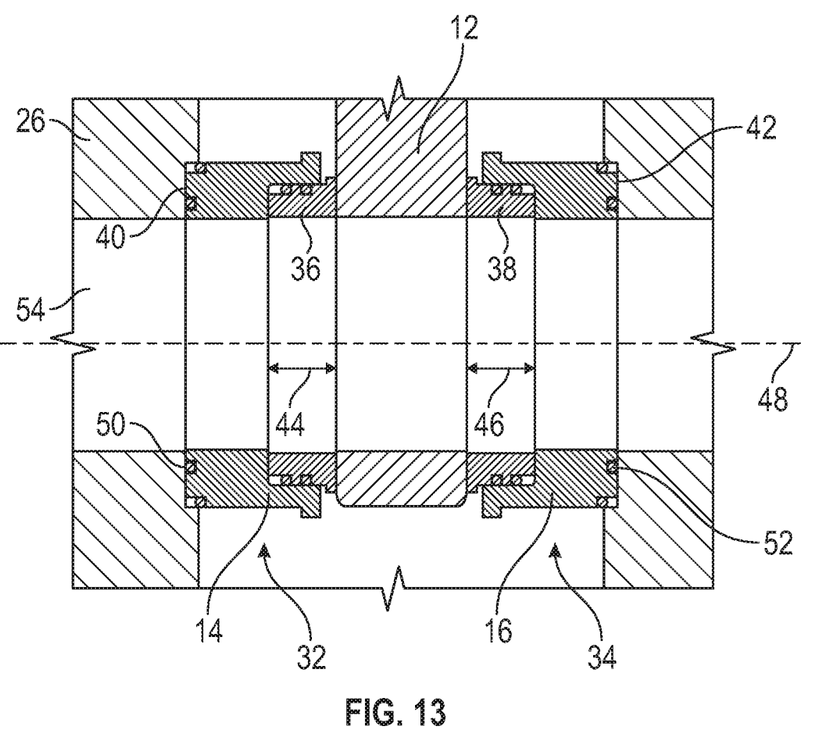
FIG. 13 is an enlarged view of the seat retainer and seat assembly on both sides of the gate with the seat retainer of each seat assembly positioned in respective pockets on both sides of the gate in accord with one embodiment of the present invention.

FIG. 13 is an enlarged view of FIG. 12 showing first seat assembly 32 and second seat assembly 34 on opposite sealing sides of gate 12. Also shown is first seat 36 and second seat 38 that are slidably mounted with respect to the seat retainers 14, 16. The seat and seat retainer pair on each side of the gate are 14, 36 and 16, 38. The seats are relatively slidable with respect to the seat retainers and are telescopingly mounted with respect to each other. However, the wedge guide preferably locks the seat retainers 14, 16 in the pockets 40, 42 and prevents any movement of the seat retainers 14, 16 with respect to pockets 40, 42 and the valve body 26 under all operating temperature and pressure conditions.

The seats 36, 38 may also be referred to as inner members because they are adjacent the gate. The seat retainers may also be referred to as outer members because they are further away from the gate. The seats and/or seat retainers may also be referred to as seat elements or the like.

FIG. 13 shows a possible non-limiting configuration of telescopingly mounted seat and seat retainers. In this embodiment, the seats are telescopingly mounted within the seat retainers with the seats being mounted inside the seat retainers. Different configurations of the seats and seat retainers are possible, some of which are shown in the list of prior art patents, so that the invention is not limited to this embodiment. For example, in one prior art patent the seat retainer is telescopingly contained within circular walls of the seat (not shown).

As indicated by arrows 44, 46 in FIG. 13, the seats 36, 38 are slidable back and forth axially by a very small distance. The seats are slidably moveable back and forth in the axial direction as indicated by direction arrows 44 and 46 along the axis 48 of flow bore 54 through the valve body 26. One advantage of the movable seats 36, 38 is upstream and downstream sealing. Another advantage is that the bonnet can be removed even when the valve is under pressure. Another advantage is that the force on the seats 36, 38 against the gate 12 is variable in response to pressure in the valve. When the pressure is low, the force on the seat is low. This results in less wear on the seats and gate. On the other hand, when the pressure is high, the force on the seat is high resulting in a tight seal with the gate under high pressure.

The first seat retainer 14 is mounted in first pocket 40 in valve body 26. The second seat retainer 16 is mounted in second pocket 42. Two wedge guides of the type shown in FIG. 1 are used to positively secure the seat retainers in the back of the pockets under all operating temperatures and pressures in a manner that prevents movement. This prevents damage to seals such as end seals 50, 52 and/or other seals for the seat retainers 14, 16 shown in FIG. 13. In other words, movement of seat retainers 14, 16 within pockets 40, 42 under high pressure and low temperatures may damage end seals 50, 52. However, the present invention prevents this damage to end seals 50, 52 and/or other seals.

Figure 2:
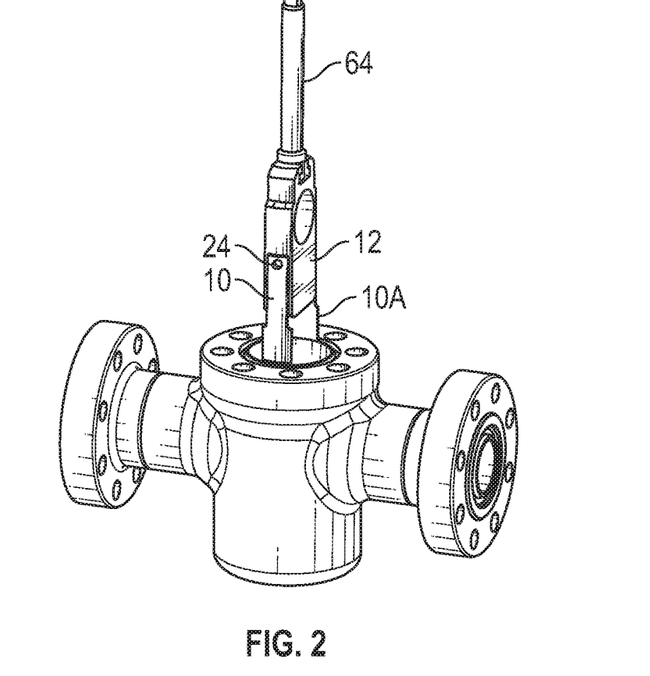
FIG. 2 is a perspective view prior to installation of the wedge guides showing two wedge guides that are inserted into the valve body adjacent the sides of the gate in accord with one embodiment of the present invention.

Referring now to FIG. 2, there is shown wedge guide 10 and 10A on the non-sealing sides or edges of gate 12 prior to being installed. The wedge guides 10, 12 slide with respect to gate 12 in response to movement of valve stem 64. However, once installed, wedge guide 10 and 10A do not move with respect to the valve body 26.

In some embodiments, the wedge guide may or may not provide any significant guidance of the gate 12 and may provide little or no guide effect for the gate 12. As noted above, the wedge guides slide with respect to the gate 12 but do not move with respect to valve body 26.

As noted above, wedge guide opening 24 may be utilized to pull the wedge guides out of the valve for maintenance purposes after installation.

Figure 3:
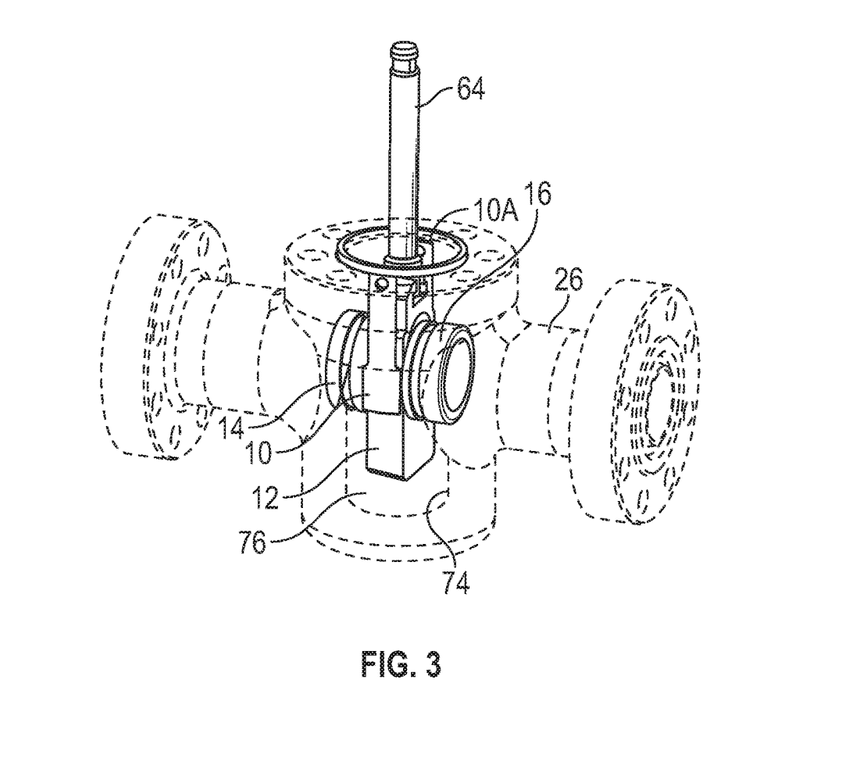
FIG. 3 is a perspective view after or during installation of the two wedge guides showing the two wedge guides inserted into the valve body to urge the seat retainers into engagement with the valve pockets in accord with one embodiment of the invention.

FIG. 3 shows the wedge guides 10 and 10A during installation as either almost installed or installed in the valve body 26. Once installed, the wedge guides 10, 10A are fixed in position with respect to valve body 26 until they are removed. Seat retainers 14, 16 are also fixed in position with respect to valve body 26. Valve stem 64 is moved up and down by wheel 30 (See FIG. 12) or another operator to move gate 12 to open and close the gate valve. The wedge guides 10, 10A and the seat retainers 14, 16 are locked in position with respect to valve body 26 despite temperature and/or pressure changes.

Figure 4:
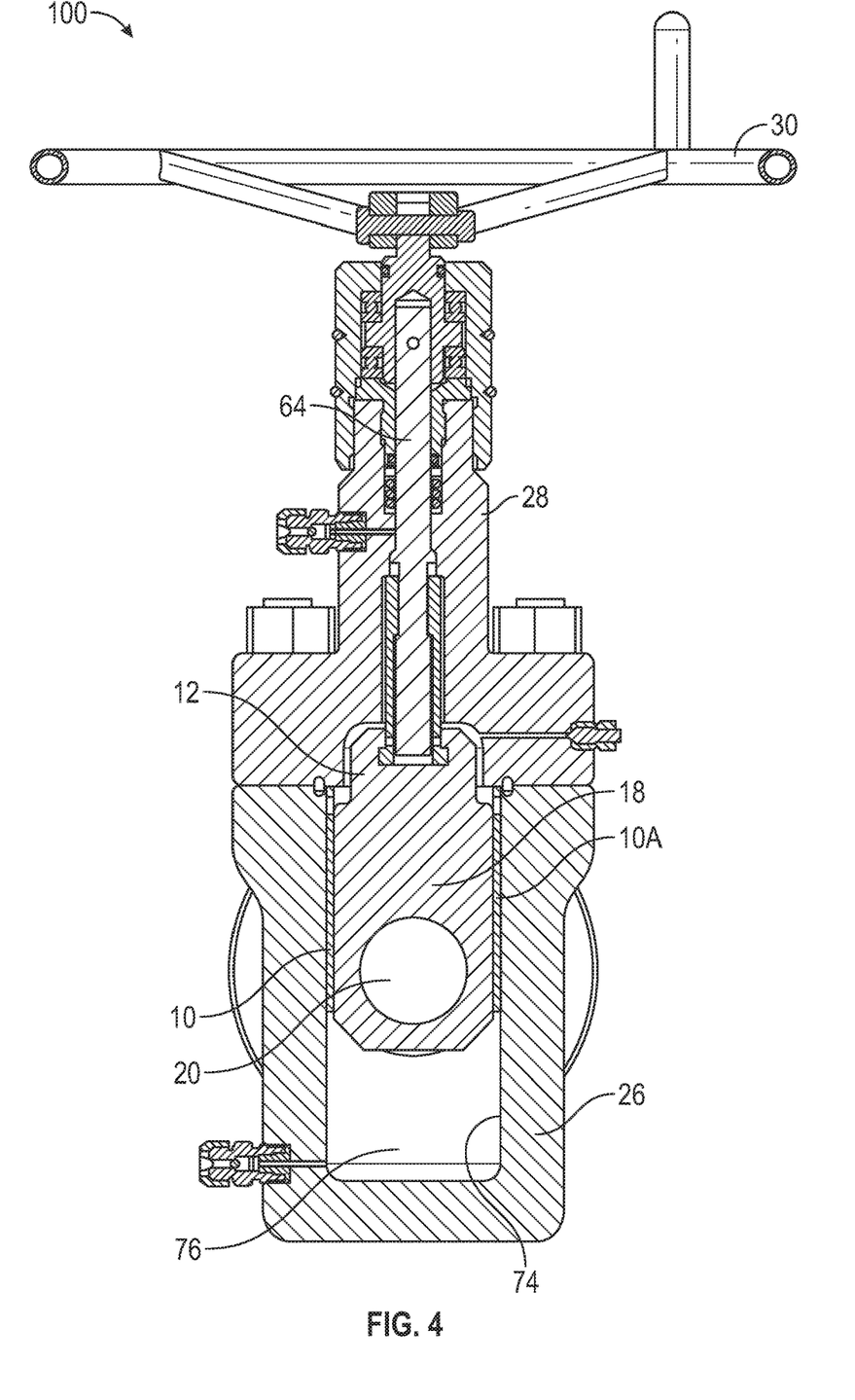
FIG. 4 is a sectional view of a gate valve showing two wedge guides on either side of the gate whereupon the wedge guides are fixed in position with respect to the body and the gate slides with respect to the wedge guides when opening and closing the gate in accord with one embodiment of the invention.

FIG. 4 shows gate valve 100 with gate 12 between the two wedge guides 10, 10A. Gate 12 slides with respect to the two wedge guides 10, 10A when the gate opens and closes. In other words, the wedge guides 10, 10A slide with respect to non-sealing sides or edges of gate 12. As discussed with respect to FIG. 5-8 below, a flat side of the wedge guides 10, 10A engages the flat sides of gate 12 and a rounded side engages the round interior surface 74 of transverse gate cavity 76. This view shows more clearly gate opening 20 and blanking portion 18, which are used to open and close the gate valve. In this embodiment, bonnet 28 secures the wedge guides in position.

Figure 5:
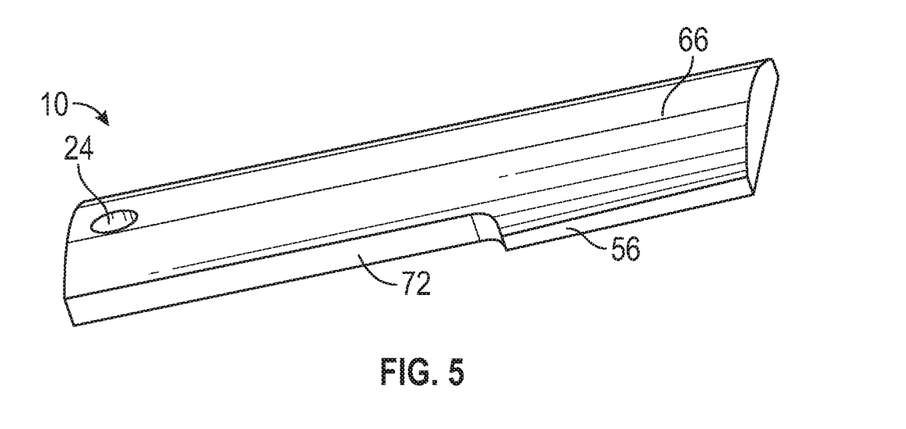
FIG. 5 is a perspective view of a wedge guide in accord with one embodiment of the invention.

FIGS. 5, 6, 7, and 8 show details of one possible embodiment of wedge guide 10. FIG. 5 shows a perspective view of wedge guide 10 with rounded surface 66, body 72, and inclined surface 56. Wedge guide 10A is identical to wedge guide 10.

Figure 6:
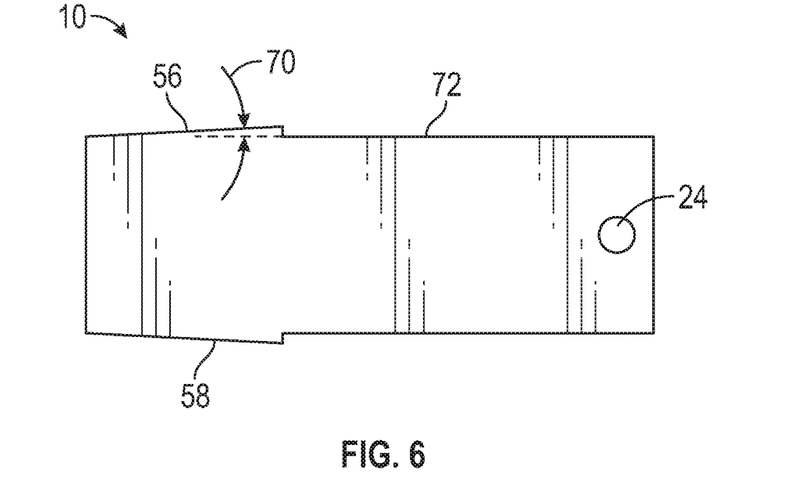
FIG. 6 is a bottom view of a wedge guide showing two angled wedge surfaces in accord with one embodiment of the invention.

Referring to the embodiment of FIG. 6, wedge first inclined surface 56 and wedge second inclined surface 58 extend out from body 72 of wedge guide 10. The surfaces are angled and may be angled by an amount less than or equal to three degrees, or less than or equal to two degrees, or less than or equal to one degree or any range within these ranges as indicated by the angle represented by arrow 70. The above ranges are non-limiting examples of the present invention.

In the embodiment of FIG. 6, the wedge surfaces extend from body 72 by a designated amount, e.g. one degree or two degrees or any degree within the ranges set forth herein to a maximum width. The angle 70 of the wedge is selected to determine the maximum width to compress and lock the two seat retainers into the back of the pockets under all operating temperature/pressure conditions until the wedges are removed for maintenance. The maximum width of the wedge guide 10, 10A is selected to encompass the tolerances for several components including the two pockets 40, 42, the two seat retainers 14, 16, and the wedge guide 10, 10A to compress the two seat retainers 14, 16 securely into the respective pockets 40, 42. Each of these components may vary slightly in size due to tolerances. See also FIG. 13.

Figure 7:
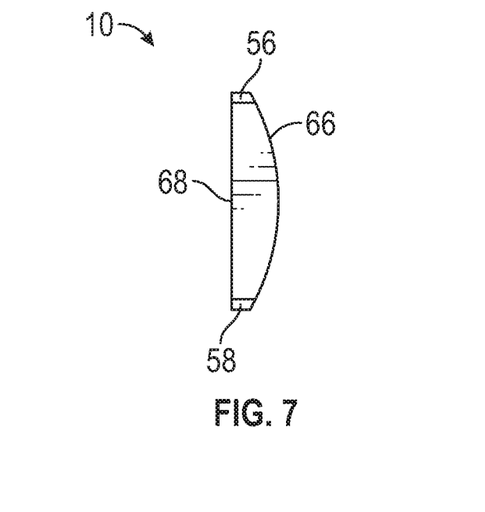
FIG. 7 is an elevational end view of a wedge guide showing curved surfaces that engage an interior of the valve body, flat surfaces that slidingly engage the gate and round surfaces that engage the interior surfaces of the gate cavity in accord with one embodiment of the invention.

FIG. 7 shows a rounded surface 66 that mates to the round interior surface 74 of the transverse gate cavity 76 (see FIG. 3 and FIG. 4). Flat surface 68 as shown in FIG. 7, 8 fits adjacent the non-sealing sides of gate 12 as shown in FIG. 4. While the flat surface 68 does slide with respect to the non-sealing sides of the gate as shown in FIG. 4, wedge guide 10 may or may not provide a guide function for the gate.

It will be appreciated that the wedge guide of FIG. 5-8 is rigid and inflexible as used. However, conceivably the wedge guide could be flexible. In this case, the wedge surfaces may conceivably be straight until compressed against the inclined wedge surfaces on the seat retainers whereupon the wedge surfaces would then comprise an inclined surface. Accordingly, it will be appreciated that the wedge guide can take on other forms that will still compress the seat retainers into the pockets so that the claims are not limited to rigid wedge guides.

Figure 8:
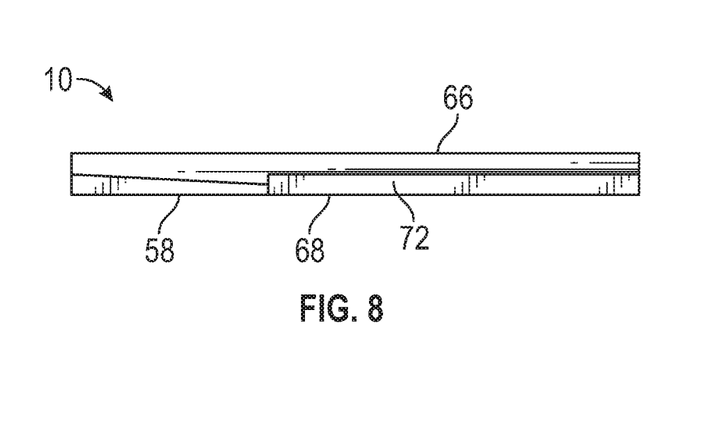
FIG. 8 is a side elevational view of a wedged guide showing a wedge inclined surface in accord with one embodiment of the invention.

FIG. 8 shows a side elevational view of wedge guide 10, with flat surface 68, inclined surface 58, body 72 and rounded surface 66.

Figure 9:
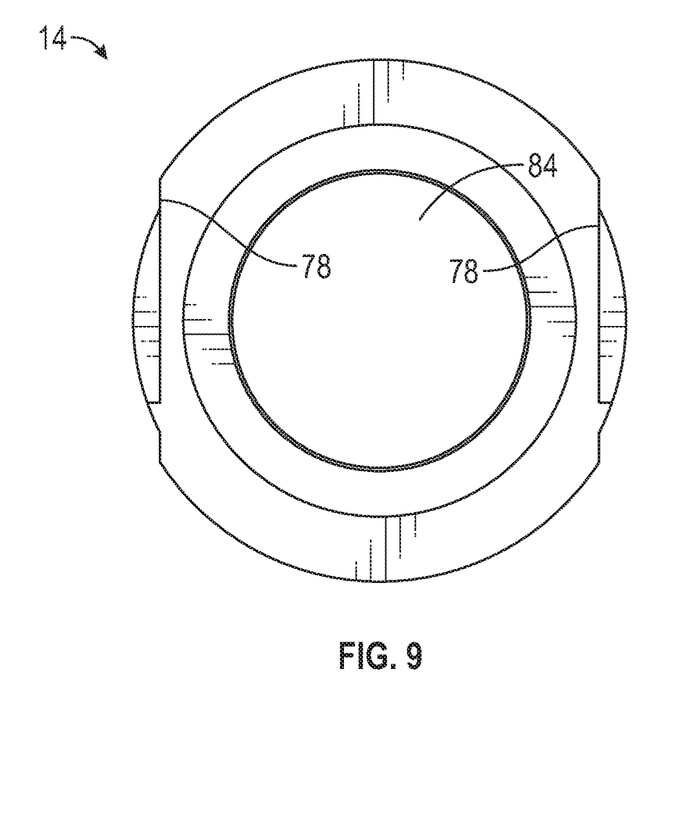
FIG. 9 is a front elevational view showing a seat retainer in accord with one embodiment of the invention.
Figure 10:
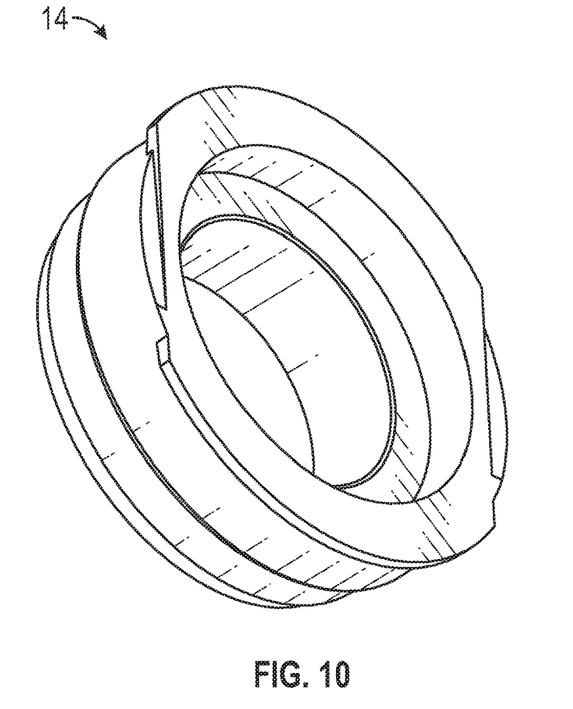
FIG. 10 is a perspective view of a seat retainer in accord with one embodiment of the invention.
Figure 11:
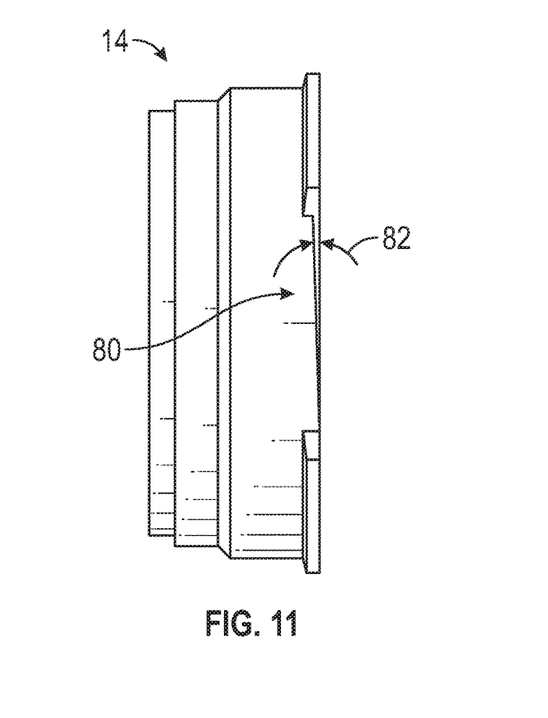
FIG. 11 is an elevational side view of a seat retainer showing inclined or angled wedge surfaces in accord with one embodiment of the invention.

FIG. 9, 10, 11 show one possible embodiment of seat retainers 14, 16. Seat retainers 14, 16 are identical in one embodiment of the invention so that only seat retainer 14 is discussed. The seat retainers 14, 16 are shown mounted in the gate valve in FIG. 12 and FIG. 13.

FIG. 11 shows tapered surfaces 80 that are angled as indicated by arrow 82. The ranges of this angle are discussed above and may typically match the angles of the wedge surfaces 56, 58. However, conceivably the angle indicated by arrow 82 on the seat retainer may be different from the angle indicated by arrow 70 on the wedge guide.

In FIG. 9, surfaces 78 receive the wedge guides that engage tapered seat inclined surfaces 80 shown in FIG. 11. It will be appreciated that when mounted in the pockets, that the seat assemblies surround flow bore 54 so that opening 84 of seat retainers 14, 16 form part of the flow bore 54. FIG. 10 shows the seat retainer in a perspective view.

Accordingly, the wedge guide is used to lock a sealing element into a pocket in the body surrounding the flow bore.

In summary, in one embodiment, a wedge guide 10, 10A for a gate 12 valve is shown that comprises a valve body 26. Valve Body 26 defines therein a flow bore 54 through the valve body 26. A gate cavity 76 intersects the flow bore.

A gate 12 is disposed in the gate cavity 76 across the flow bore 54. The gate 12 is moveable to open and close the flow bore 54.

The valve body 26 defines a first pocket 40 in the valve body 26 on one side of the gate 12 and a second pocket 42 in the valve body 26 on an opposite side of the gate 12.

A first seat assembly 32 surrounds the flow bore 54. The first seat assembly 32 is positioned between the first pocket 40 and the gate 12. The first seat assembly 32 comprises a first seat 36 and a first seat retainer 14. The first seat 36 is adjacent to the gate 12. The first seat 36 is slidable with respect to the first seat retainer 14. The first seat 36 is axially slidable between the gate 12 and the first seat retainer 14 along an axis 48 through the flow bore.

A second seat assembly 34 surrounds the flow bore 54. The second seat assembly 34 is positioned between the second pocket 42 and gate 12. The second seat assembly 34 comprises a second seat 38 and a second seat retainer 16. The second seat 38 is adjacent to the gate 12. The second seat 38 is slidable with respect to the second seat retainer 16. The second seat 38 is axially slidable between the gate 12 and the second seat retainer 16 along an axis 48 through the flow bore 54.

A wedge guide 10, 10A comprising a first wedge surface 56 engages the first seat retainer 14 to urge the first seat retainer 14 into the first pocket 40 to prevent movement of the first seat retainer 14 with respect to the first pocket 40. The wedge guide 10, 10A comprising a second wedge surface 58 that engages the second seat retainer 16 to urge the second seat retainer 16 into the second pocket 42 to prevent movement of the second seat retainer 16 with respect to the second pocket 42.

More generally, while the invention is described in terms of a specific type of exemplary seating assemblies, the wedge guide with angled surface may be used with a gate valve comprising any type of seat elements on opposite sides of the gate that are to be affixed to pockets on either side of the gate.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A wedge guide for a gate valve, comprising:
said gate valve comprises a valve body that defines therein a flow bore through said valve body and a gate cavity that intersects said flow bore, a gate is disposed in said gate cavity across said flow bore, said gate being moveable to open and close said flow bore, said valve body defining a first pocket in said valve body on one side of said gate and a second pocket in said valve body on an opposite side of said gate, a first seat assembly surrounding said flow bore, said first seat assembly being positioned between said first pocket and said gate, said first seat assembly comprising a first seat and a first seat retainer, said first seat being adjacent to said gate, said first seat being slidable with respect to said first seat retainer, said first seat being axially movable between said gate and said first seat retainer along an axis through said flow bore, a second seat assembly surrounding said flow bore, said second seat assembly being positioned between said second pocket and said gate, said second seat assembly comprising a second seat and a second seat retainer, said second seat being adjacent to said gate, said second seat being slidable with respect to said second seat retainer, said second seat being axially movable between said gate and said second seat retainer along an axis through said flow bore; and
a wedge guide, said wedge guide comprising a first wedge surface that engages said first seat retainer to urge said first seat retainer into said first pocket to prevent movement of said first seat retainer with respect to said first pocket, said wedge guide comprising a second wedge surface that engages said second seat retainer to urge said second seat retainer into said second pocket to prevent movement of said second seat retainer with respect to said second pocket.

2. The wedge guide for said gate valve of claim 1, further comprising a second wedge guide, said second wedge guide also comprising a first wedge surface that engages said first seat retainer to urge said first seat retainer into said first pocket to prevent movement of said first seat retainer with respect to said first pocket, said second wedge guide also comprising a second wedge surface that engages said second seat retainer to urge said second seat retainer into said second pocket to prevent movement of said second seat retainer with respect to said second pocket.

3. The wedge guide for said gate valve of claim 2, further comprising said gate is positioned between said wedge guide and said second wedge guide, said gate being slidable with respect to said wedge guide and said second wedge guide.

4. The wedge guide for said gate valve of claim 1, further comprising a rounded surface on said wedge guide which mates to a rounded surface for said gate cavity.

5. The wedge guide for said gate valve of claim 4, further comprising a flat surface on said wedge guide, said flat surface being positioned on an opposite side of said wedge guide from said rounded surface.

6. The wedge guide for said gate valve of claim 1, said wedge guide comprising an opening, said opening being engageable to remove said wedge guide from said valve body.

7. The wedge guide for said gate valve of claim 6, further comprising said first wedge surface and said second wedge surface being positioned at a lower end of said wedge guide when said valve body is oriented for operation.

8. The wedge guide for said gate valve of claim 1, further comprising said first wedge surface and said second wedge surface are angled with respect to an axis through said wedge guide.

9. The wedge guide for said gate valve of claim 8, further comprising angled surfaces on said first seat retainer and said second seat retainer that engage said first wedge surface and said second wedge surface.

10. The wedge guide for said gate valve of claim 1, further comprising said wedge guide is rigid so that said first wedge surface and said second wedge surface are angled prior to engagement with said first seat retainer and said second seat retainer.

11. A wedge guide assembly for a gate valve, comprising:
two wedge guides;
said gate valve comprising:
a gate which is moveable to open and close a flow bore through said gate valve, said gate being mounted between said two wedge guides, a valve body defining a first pocket and a second pocket formed in said valve body, each of said first pocket and said second pocket surrounding said flow bore,
a first seat assembly on a first side of said gate, said first seat assembly comprising a first seat adjacent said first side of said gate, a first seat retainer being mounted in said first pocket, said first seat being slidably mounted with respect to said first seat retainer, said first seat being axially movable between said gate and said first seat retainer along an axis through said flow bore,
a second seat assembly on a second side of said gate, said second seat assembly comprising a second seat adjacent said second side of said gate, a second seat retainer being mounted in said second pocket, said second seat being slidably mounted with respect to said second seat retainer, said second seat being axially movable between said gate and said second seat retainer along an axis through said flow bore;
a first wedge surface on each of said two wedge guides that engages said first seat retainer to prevent movement of said first seat retainer in said first pocket with respect to said valve body when said gate moves to open and close said gate valve; and
a second wedge surface on each of said two wedge guides that engages said second seat retainer to prevent movement of said second seat retainer in said second pocket with respect to said valve body when said gate moves to open and close said gate valve.

12. The wedge guide assembly for said gate valve of claim 11, wherein said first wedge surface on each of said two wedge guides comprises an inclined surface that is angled with respect to an axis through each of said two wedge guides, and wherein said second wedge surface on each of said two wedge guides comprises an inclined surface that is angled with respect to said axis through each of said two wedge guides.

13. The wedge guide assembly for said gate valve of claim 12, wherein said first wedge surface on each of said two wedge guides is angled by less than or equal to two degrees with respect to an axis through each of said two wedge guides, and wherein said second wedge surface on each of said two wedge guides is angled by less than two degrees.

14. The wedge guide assembly for said gate valve of claim 12, wherein said first seat retainer comprises two inclined surfaces that engage said first wedge surface on each of said two wedge guides, and wherein said second seat retainer comprises two inclined surfaces that engage said second wedge surface on each of said two wedge guides.

15. The wedge guide assembly for said gate valve of claim 14, wherein each of said two wedge guides are rigid and angled prior to insertion into said gate valve.

16. The wedge guide assembly for said gate valve of claim 11, said two wedge guides each comprising an opening, said opening in each of said two wedge guides being engageable to remove said two wedge guides from said valve body.

17. A wedge guide assembly for a gate valve, comprising:
said gate valve comprising a gate movable to open and close a flow bore through a valve body, two seat assemblies surrounding said flow bore, said gate being mounted between said two seat assemblies, each of said two seat assemblies comprising a seat retainer and a seat wherein said seat slidingly moves with respect to seat retainer, said seat of each of said two seat assemblies being movable axially between said gate and said seat retainer, said valve body defining two pockets on either side of said gate, said seat retainer of each of said two seat assemblies being inserted into one of said two pockets; and
two wedge guides, said two wedge guides being affixed with respect to said valve body when said gate moves to open and close said flow bore, each wedge guide comprising two wedge surfaces, said two wedge surfaces of each wedge guide engaging respective surfaces on said seat retainer of said two seat assemblies to prevent said seat retainer of said two seat assemblies from moving with respect to said valve body, said gate being mounted between said two wedge guides.

18. The wedge guide assembly for said gate valve of claim 17, further comprising a bonnet that attaches to said valve body, a surface on each of said two wedge guides that engages said bonnet so that as said bonnet is tightened to said valve body then each of said two wedge guides locks said seat retainer of each of said two seat assemblies into one of said two pockets to prevent further movement of said seat retainers with respect to said valve body.

19. The wedge guide assembly for said gate valve of claim 17, further comprising a rounded surface for each of said two wedge guides being engaged with a corresponding rounded surface in said valve body.

20. A wedge guide for a gate valve, comprising:
said gate valve comprises a valve body that defines therein a flow bore through said valve body and a gate cavity that intersects said flow bore, a gate is disposed in said gate cavity across said flow bore, said gate being moveable to open and close said flow bore, said valve body defining a first pocket in said valve body on one side of said gate and a second pocket in said valve body on an opposite side of said gate, a first seat element that engages said first pocket, a second seat element that engages said second pocket; and a wedge guide, said wedge guide comprising a first angled surface that engages said first seat element to prevent movement of said first seat element with respect to said first pocket, said wedge guide comprising a second angled surface that engages said second seat element to urge said second seat element into said second pocket to prevent movement of said second seat element with respect to said second pocket.

\* \* \* \* \*